United States Patent
Matsumoto et al.

(10) Patent No.: US 9,605,470 B2
(45) Date of Patent: Mar. 28, 2017

(54) PROTECTOR WITH SENSOR AND METHOD OF MOLDING END PART OF THE SAME

(71) Applicant: Nishikawa Rubber Co., Ltd., Hiroshima-shi, Hiroshima-ken (JP)

(72) Inventors: Michihiko Matsumoto, Hiroshima (JP); Yuzo Hirakawa, Hiroshima (JP)

(73) Assignee: NISHIKAWA RUBBER CO., LTD., Hiroshima-Shi, Hiroshima-Ken (JP)

( * ) Notice: Subject to any disclaimer, the term of this patent is extended or adjusted under 35 U.S.C. 154(b) by 148 days.

(21) Appl. No.: 14/639,764

(22) Filed: Mar. 5, 2015

(65) Prior Publication Data
US 2015/0267457 A1 Sep. 24, 2015

(30) Foreign Application Priority Data
Mar. 18, 2014 (JP) ................................ 2014-054900

(51) Int. Cl.
*B29C 45/14* (2006.01)
*E05F 15/73* (2015.01)
(Continued)

(52) U.S. Cl.
CPC ........ *E05F 15/73* (2015.01); *B29C 45/14467* (2013.01); *B60J 10/24* (2016.02); *B60J 10/80* (2016.02); *B60J 10/82* (2016.02); *G01D 5/14* (2013.01); *G01D 11/16* (2013.01); *G01D 11/24* (2013.01); *G01L 1/005* (2013.01); *B29K 2023/16* (2013.01); *E05F 15/44* (2015.01); *E05F 15/443* (2015.01);
(Continued)

(58) Field of Classification Search
CPC ...................................................... E05F 15/73
See application file for complete search history.

(56) References Cited

U.S. PATENT DOCUMENTS 7,215,529 B2 * 5/2007 Rosenau .................. B60J 10/00
361/277
8,191,427 B2 6/2012 Hattori et al.
(Continued)

FOREIGN PATENT DOCUMENTS

DE WO 0057013 A1 * 9/2000 .............. B60J 10/00
DE 102011000317 A1 8/2011
(Continued)

OTHER PUBLICATIONS

European Search Report dated Nov. 6, 2015 in corresponding European Patent Application No. EP 15157083, 5 pages.

*Primary Examiner* — Ryan Walsh
(74) *Attorney, Agent, or Firm* — Robert P. Michal, Esq.; Carter, DeLuca, Farrell & Schmidt, LLP

(57) ABSTRACT

A protector with a sensor is installed on a sliding door for detecting an object by touch between two core wires in a hollow part. In a terminal part of the protector with the sensor, the core wires drawn out are connected with legs of a resistor. A primary seal is formed by grinding a surface of the hollow part of the terminal part of an extrusion molded part, positioning a ground part on a die and covering wire connection parts and a side of another end of an insert while also covering the ground part by means of injection molding. A secondary seal is formed by means of the injection molding for coating a part formed with the primary seal for forming an external shape of a product.

7 Claims, 12 Drawing Sheets

(51) Int. Cl.
*G01D 5/14* (2006.01)
*G01D 11/16* (2006.01)
*G01D 11/24* (2006.01)
*G01L 1/00* (2006.01)
*B60J 10/24* (2016.01)
*B60J 10/80* (2016.01)
*B60J 10/82* (2016.01)
*B29K 23/00* (2006.01)
*E05F 15/44* (2015.01)

(52) U.S. Cl.
CPC ....... *E05Y 2600/40* (2013.01); *E05Y 2800/46* (2013.01); *E05Y 2900/531* (2013.01); *E05Y 2900/542* (2013.01)

(56) References Cited

U.S. PATENT DOCUMENTS

| | | | | |
|---|---|---|---|---|
| 2011/0126470 | A1* | 6/2011 | Higgins | B60R 16/0215 49/404 |
| 2013/0284576 | A1 | 10/2013 | Ishihara | |
| 2014/0339842 | A1* | 11/2014 | Kawaguchi | B60J 5/0495 296/1.04 |
| 2015/0042361 | A1* | 2/2015 | Matsuda | E05F 15/0008 324/661 |
| 2015/0267453 | A1* | 9/2015 | Matsumoto | E05F 15/42 49/27 |
| 2015/0267462 | A1* | 9/2015 | Matsumoto | B29C 45/14065 73/862.541 |
| 2016/0104585 | A1* | 4/2016 | Clemente | F16P 3/12 200/600 |
| 2016/0144802 | A1* | 5/2016 | Hirakawa | B60R 13/02 296/1.08 |
| 2016/0145927 | A1* | 5/2016 | Hirakawa | E05F 15/443 296/1.04 |

FOREIGN PATENT DOCUMENTS

| | | |
|---|---|---|
| DE | 202011050716 U1 | 9/2012 |
| EP | 1319788 A2 | 6/2003 |
| EP | 2546846 A1 | 1/2013 |
| JP | H1040776 A | 2/1998 |
| JP | 3700267 B2 | 9/2005 |
| JP | 3844684 B2 | 11/2006 |
| JP | 2011-022038 A | 2/2011 |

* cited by examiner

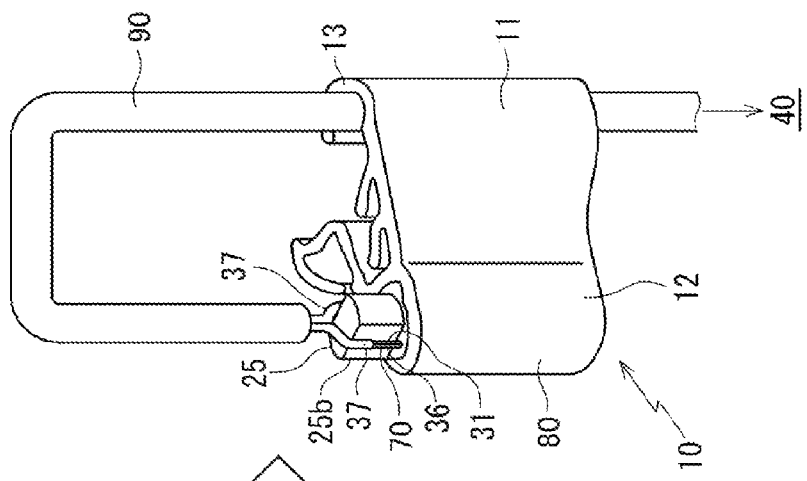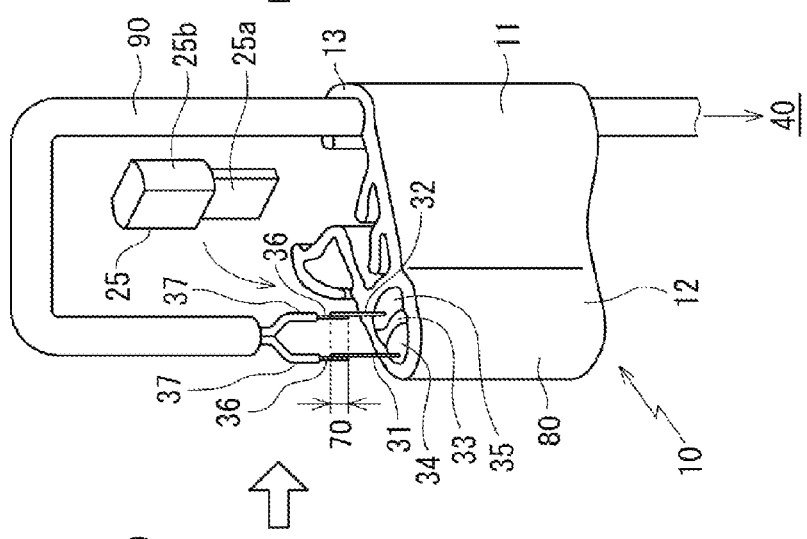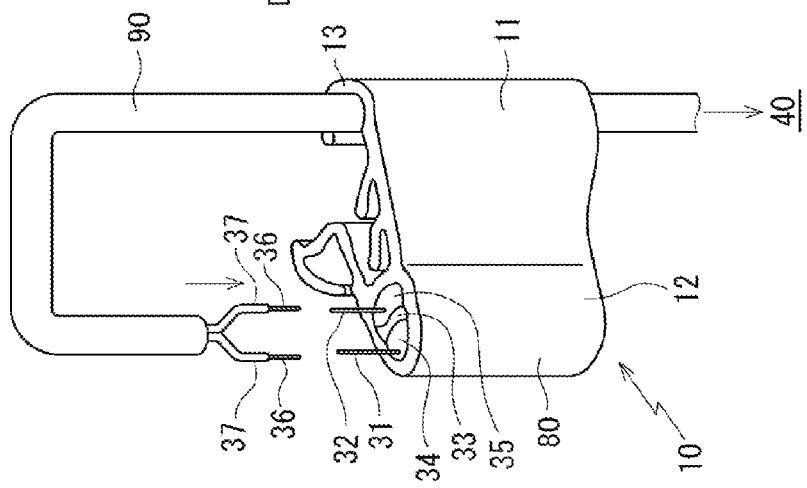

PROTECTOR WITH SENSOR AND METHOD OF MOLDING END PART OF THE SAME

CROSS REFERENCE TO RELATED APPLICATION

This application claims the benefit under 35 USC §119 of JP Patent Application JP 2014-054900 filed Mar. 18, 2014, the entire disclosure of which is incorporated herein by reference.

BACKGROUND INFORMATION

The present invention relates to protectors with sensors and methods of molding end parts of the protectors with the sensors. When objects including fingers are disposed between openings of automobiles and opening/closing panels which move between at least two positions to open and close the openings of automobiles, the sensors of the protectors output corresponding signals for detecting the objects. The opening/closing panels include: doors such as sliding doors on wagons, station wagons or the like sliding frontward and rearward of the automobile bodies and back doors; and sun roofs.

A protector 10, 20 with a sensor is installed on an automobile including a wagon shown in FIG. 8 of which a sliding door 1 (or a back door) moves between at least two positions to open and close an opening of an automobile body or on an automobile shown in FIG. 9 of which sun roof 2 opens or closes the opening of the automobile body.

For example, the protector 10 with the sensor, extending in an upper and lower direction as shown in FIG. 10, is installed on a front end surface of the sliding door 1. The protector 10 with the sensor extends frontward of the automobile body from the front end surface of the sliding door 1.

As shown in FIG. 11 and FIG. 12, the protector 10 with the sensor, installed on the front end surface of the sliding door 1 includes: an installation base member 11 having a substantially U-shaped cross section including an inner-cabin side wall 11a, an outer-cabin side wall 11b and a connecting wall 11c; and a hollow part 12 integrally molded with the installation base member 11. The hollow part 12 includes a sensor (pressure sensitive sensor) 80 which outputs a corresponding electric signal upon detecting the object such as a part of human bodies (fingers, hands or legs) between the sliding door 1 and a body side opening (may also be front door or side door) (see, for example, Japanese examined Patent Publications No. 3700267, No. 3844684 and Japanese unexamined Patent Publication No. 2011-022038).

In a lower part of the protector 10 with the sensor, a channel part 13 having a substantially C-shaped cross section is integrally molded with the inner-cabin side wall 11a side of the installation base member 11 for holding wire harness 90 joined with the pressure sensitive sensor 80. The installation base member 11 has a plurality of holding lips 14 formed inside and a core 15 having a substantially U-shaped cross section embedded therein for increasing rigidity. In addition, a decorative lip 16 is provided on the outer-cabin side wall 11b of the installation base member 11.

The sensor (pressure sensitive sensor) 80 has two core wires (electrode wires) 31, 32 extending in an upper and lower direction (longitudinal direction) embedded in rubber like elastic bodies 34, 35 having conductivity with a space 33 therebetween, which are fixed in the hollow part 12. As the object is disposed between the sliding door 1 and the body side opening when the sliding door 1 is moved towards a closed position, the object makes contact with a part of the hollow part 12, and then the rubber like elastic bodies 34, 35 contact with each other and the two core wires 31, 32 short. Resultant change in electric signal is transmitted to a control unit 40 joined with leads 36, 36 which are connected with the two core wires 31, 32 in a lower side terminal part of the protector 10 with the sensor, and as a result, the objects are detected. The leads 36, 36 covered with insulator are tied by the wire harness 90. Top ends of the leads 36, 36, bared from covered parts 37, 37 are naked wires.

As shown in FIGS. 13(a) to 13(c), in the lower side terminal part of the protector 10 with the sensor, the leads 36 are piled on the two core wires 31, 32 drawn out in a longitudinal direction (left direction in FIGS. 13(a) to 13(c) relative to a sheet), the leads 36 and the two core wires 31, 32 are connected by means of resistance welding or soft soldering (FIG. 13(b)) and an insert 25 fills up the space 33 which is exposed in an end part (FIG. 13(c)). Then, as shown in FIG. 14, wire connection parts 70, 70, the insert 25 and a part of the wire harness 90 are embedded in a die molded part by means of die molding and are not exposed.

Also, as shown in FIG. 15, in an upper side terminal part of the protector 10 with the sensor, legs 39a, 39a of a resistor 39 are piled on the two core wires 31, 32 drawn out in the longitudinal direction (right direction in FIG. 15 relative to the sheet), the legs and the two core wires 31, 32 are connected by means of resistance welding or soft soldering and an insert 26 fills up the space 33. Then, the wire connection parts 70, the insert 26 and the resistor 39 are embedded in a die molded part by means of the die molding and are not exposed.

In FIGS. 14 and 15, dotted lines show the die molded parts.

When water enters the wire connection parts 70, 70, connected circuits may short, which causes improper operations. The wire connection parts 70, 70 are between the two core wires 31, 32 and the leads 36, 36 of the lower side terminal part of the protector 10 with the sensor or between the two core wires 31, 32 and the legs 39a, 39a of the resistor 39 of the upper side terminal part of the protector 10 with the sensor. The wire connection parts 70, 70 are connected by means of resistance welding or soft soldering.

In this connection, the wire connection parts 70, 70 can be firmly fixed by sealing agent (adhesive) of epoxy resin disclosed in Japanese examined Patent Publication No. 3700267. But the structure necessitates an extra process of adhesion and minutes or hours of time for curing the sealing agent. In addition, an increase in amount of adhesive to be used has caused insufficient adhesion. Further, use of adhesive tends to cause unevenness, which makes it difficult to stably fix the wire connection parts 70, 70.

In addition, the epoxy resin is high in hardness. Accordingly, when the epoxy resin is subjected to stress, the epoxy resin may exfoliate from the terminal part of the protector 10 with the sensor which is extrusion molded, thereby causing water leak. As a result, it becomes necessary to substitute softer resin for the epoxy resin, thereby unstably fixing the wire connection parts 70, 70.

Especially, in case the wire connection parts 70, 70 are not stably fixed, external shapes of resultant products become uneven while die molding the external shapes.

Alternatively, the wire connection parts 70, 70 can be doubly coated by means of hot melt molding disclosed in Japanese examined Patent Publication No. 3844684. But the structure necessitates extra members including supporting members for connecting hard-wirings, has a problem concerning heat-resistance and is degraded in mold releasability from the dies.

In this connection, the wire connection parts 70, 70 between the core wires 31, 32 and the leads 36, 36 and a side of another end of the insert 25, or the wire connection parts 70, 70 between the core wires 31, 32 and the legs 39a, 39a of the resistor 39 and the side of another end of the insert 26 can be positioned on a die, and covered by means of injection molding. But the structure requires that close adherence be improved between a part which is formed by means of the injection molding and the terminal part of the protector 10 with the sensor which is formed by means of extrusion molding.

Japanese unexamined Patent Publication No. 2011-022038 discloses to mold resin material into a hollow terminal part for coating the wire connection parts. But the structure does not include the insert inserted into the terminal part for separating the two wire connection parts from each other. Accordingly, the structure necessitates an extra part made of the resin material for preventing the two wire connection parts from coming into contact with each other by partitioning the two wire connection parts.

The structure of Japanese unexamined Patent Publication No. 2011-022038 does not include the insert inserted into the terminal part. Accordingly, at a later stage of die molding, an extra lid or a weir needs to be molded for preventing decline in sensor function caused by die molding material flowing into a sensor side.

Therefore, an object of the present invention is to provide the protectors with sensors and the methods of molding the end parts of the protectors with the sensors, which are capable of decreasing unevenness in the shapes of the products while die molding the terminal parts, excellent in operability and capable of attaining sufficient sealing function.

SUMMARY

In order to achieve the above-mentioned object, according to one aspect of the invention, a protector with a sensor is provided, the protector with the sensor including: an installation base member (11) operatively coupled on a peripheral edge of an opening/closing panel which moves between at least two positions to open and close an opening of an automobile body or on a peripheral edge of said opening of the automobile body, the opening/closing panel including a door (1) and a sun roof (2) of an automobile; and a hollow part (12) unified with the installation base member (11), the hollow part (12) having two core wires (31, 32) and a space (33) provided therein, the space (33) being positioned between the two core wires (31, 32); said installation base member (11) and said hollow part (12) forming an extrusion molded part made of a rubber like elastic body which is extrusion molded, in which:

when an object is disposed between said opening/closing panel and said opening and makes contact with said hollow part (12) when said opening/closing panel is moved towards a closed position, a corresponding change in electric signal detects said object; and in a terminal part of said extrusion molded part, said core wires (31, 32) drawn out in a longitudinal direction are connected with two leads (36, 36, 39a, 39a), said two leads (36, 36, 39a, 39a) being joined with a control unit (40) or an electrical component (39), and a side of one end (25a, 26a) of an insert (25, 26) made of a non-conductive material is inserted in and fills up said space (33), and said terminal part of said extrusion molded part is die molded, wherein:

the terminal part of said extrusion molded part which is extrusion molded has a primary sealing layer (100) and a secondary sealing layer (200) formed thereon by means of injection molding respectively, said primary sealing layer (100) covering wire connection parts (70, 70) of said core wires (31, 32) and said leads (36, 36, 39a, 39a) and a side of another end (25b, 26b) of said insert (25, 26) while also covering a ground part (51, 61) on a surface of said hollow part (12) of the terminal part of said extrusion molded part, and said secondary sealing layer (200) being piled on and covering the primary sealing layer (100), and said secondary sealing layer (200) forming an external shape of a product.

It is to be noted that the "change in electric signal" includes a change by short between the two core wires, and a change in capacitance.

In addition, according to an aspect of the present invention, a method of molding an end part of a protector with a sensor is provided, the protector with the sensor including: an installation base member (11) operatively coupled on a peripheral edge of an opening/closing panel which moves between at least two positions to open and close an opening of an automobile body or on a peripheral edge of said opening of the automobile body, the opening/closing panel including a door (1) and a sun roof (2) of an automobile; and a hollow part (12) unified with the installation base member (11), the hollow part (12) having two core wires (31, 32) and a space (33) provided therein, the space (33) being positioned between the two core wires (31, 32); said installation base member (11) and said hollow part (12) forming an extrusion molded part made of a rubber like elastic body which is extrusion molded, in which:

when an object is disposed between said opening/closing panel and said opening and makes contact with said hollow part (12) when said opening/closing panel is moved towards a closed position, a corresponding change in electric signal detects said object; and in a terminal part of said extrusion molded part, said core wires (31, 32) drawn out in a longitudinal direction are connected with two leads (36, 36, 39a, 39a), said two leads (36, 36, 39a, 39a) being joined with a control unit (40) or an electrical component (39), and a side of one end (25a, 26a) of an insert (25, 26) made of a non-conductive material is inserted in and fills up said space (33), and said terminal part of said extrusion molded part is die molded, the method including:

forming a primary seal by grinding a surface of said hollow part (12) of the terminal part of said extrusion molded part, positioning a ground part (51, 61) on a die and covering wire connection parts (70, 70) of said core wires (31, 32) and said leads (36, 36, 39a, 39a) and a side of another end (25b, 26b) of said insert (25, 26) by means of injection molding; and forming a secondary seal on a part formed with the primary seal by means of the injection molding for forming an external shape of a product.

In addition, according to an aspect of the present invention, the method further includes: grinding a surface of said hollow part (12) beyond said primary seal; and forming the secondary seal by means of the injection molding for covering a ground part (53, 63) on the surface of said hollow part (12).

In addition, according to an aspect of the present invention, a range subjected to grinding on the surface of said hollow part (12) of the terminal part of said extrusion molded part includes a primary ground range (400) on a position close to an end surface of said extrusion molded part and a secondary ground range (500) on a position far from said end surface, said primary seal being formed by means of the injection molding for covering said primary ground range (400), and said secondary seal being formed by means of the injection molding for covering said secondary ground range (500).

In addition, according to an aspect of the present invention, said extrusion molded part is made of EPDM, and die molding material of said primary seal and said secondary seal includes TPO.

Symbols in parentheses show constituents or items corresponding to the drawings.

According to the present invention, the terminal part of the extrusion molded part is die molded after the side of the one end of the insert made of the non-conductive material is inserted in and fills up the space. The structure prevents decline in sensor function caused by die molding material flowing into a side of the sensor from the space on the terminal part of the extrusion molded part during the die molding. Accordingly, an extra lid or weir does not need to be molded on the terminal part of the extrusion molded part. In addition, the side of the one end of the insert, inserted in the space separates two wire connection parts from each other and prevents the two wire connection parts from coming into contact with each other. Accordingly, the structure does not necessitate an extra part made of the resin material for partitioning the two wire connection parts as in the prior art.

The wire connection parts of the core wires and the leads joined with the control unit or the electrical component, which are exposed from the terminal part of the extrusion molded part of the protector with the sensor, are doubly sealed by the primary sealing layer and the secondary sealing layer. The structure improves certainty in sealing property in the terminal part.

In addition, the primary sealing layer and the secondary sealing layer are formed by means of the ordinary injection molding. Accordingly, as compared with a case using adhesive, the structure does not necessitate time for curing the sealing agent, which reduces time for operation and lowers cost. Also, the structure does not necessitate extra members including supporting members as in the prior art, which simplifies the operation. Further, since the structure enables to quantitatively inject the die molding material into the dies at a constant pressure, resultant products are hardly uneven and perform stable sealing function.

When forming the primary sealing layer which directly covers the wire connection parts by means of injection molding, the surface of the hollow part of the terminal part of the extrusion molded part is ground first, for example by buffing. Then, the primary sealing layer covers the wire connection parts and the side of the other end of the insert while also covering the ground part. As compared with a case in which the surface is not ground, the structure improves close adherence of the primary sealing layer on the terminal part of the protector with the sensor which is extrusion molded.

Accordingly, the primary sealing layer formed by means of the injection molding does not easily come off the terminal part of the protector with the sensor formed by means of extrusion molding. The structure prevents water leak and improves sealing property.

When injection molding TPO materials on the terminal parts of the extrusion molded parts made of EPDM which is extrusion molded, there have remained problems concerning the close adherence between EPDM and TPO. But piling TPO on ground EPDM as in the present invention improves the close adherence. Accordingly, the present invention is especially effective to a combination EPDM and TPO.

In addition, the secondary seal formed by means of the injection molding covers the ground part on the surface of the hollow part beyond the surface of the primary seal as well as the primary sealing layer 100. As compared with an edge gluing, double overmolding improves sealing property.

In addition, the range subjected to grinding on the surface of the hollow part of the terminal part of the extrusion molded part includes the primary ground range and the secondary ground range. The primary seal is formed by means of the injection molding for covering the primary ground range, and the secondary seal is formed by means of the injection molding for covering the secondary ground range. In other words, the secondary ground range on which the secondary seal is to be piled is prepared even before the primary seal is formed. The structure reduces time required for operation after the primary seal is formed.

BRIEF DESCRIPTION OF THE DRAWINGS

FIG. 13(a), FIG. 13(b) and FIG. 13(c) are perspective views of ordinary processes before die molding a lower side terminal part of a protector with a sensor;

DETAILED DESCRIPTION

Figure 1A:
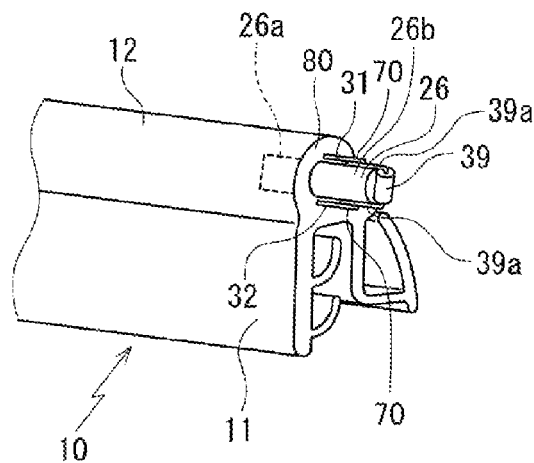
FIG. 1(a), FIG. 1(b) and FIG. 1(c) are perspective views showing an order in which a primary sealing layer is formed on an upper side terminal part of a protector with a sensor according to an embodiment of the present invention.

Referring to the Drawings, a protector with a sensor according to an embodiment of the present invention will be described.

Figure 8:
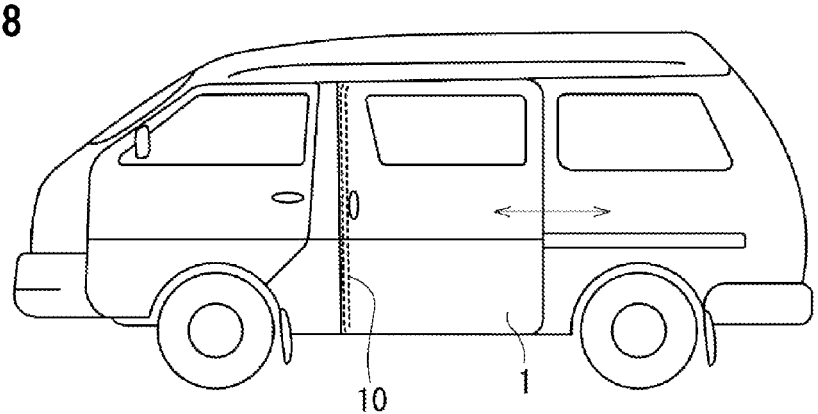
FIG. 8 is a side view of an automobile which opens or closes by a sliding door.
Figure 14:
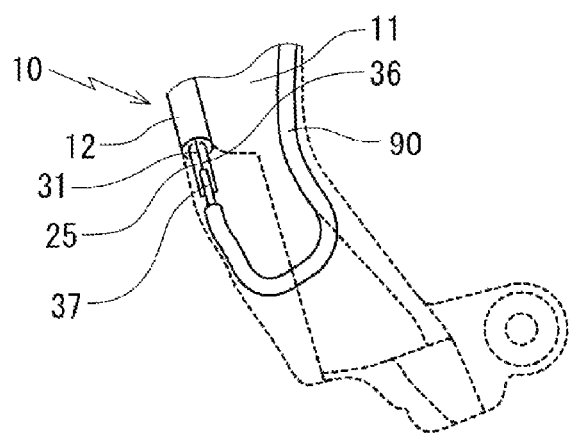
FIG. 14 is a perspective view of a structural gist of the lower side terminal part of the protector with the sensor according to the prior art after die molding.
Figure 15:
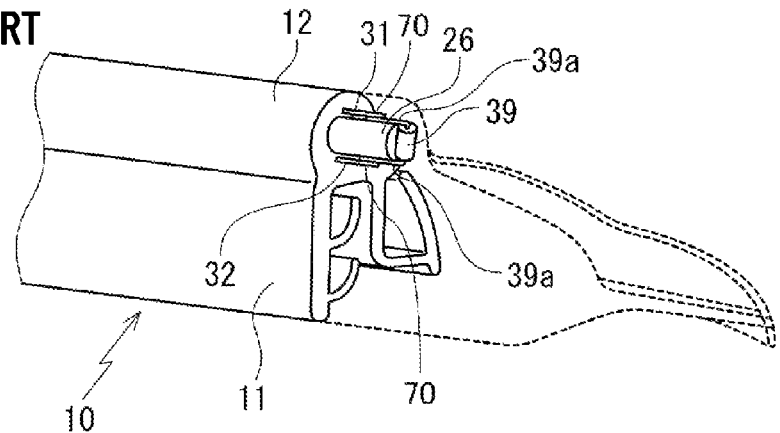
FIG. 15 is a perspective view of a structural gist of an upper side terminal part of the protector with the sensor according to the prior art after die molding.

A protector 10 with a sensor of the embodiment of the present invention, which extends toward a front side of an automobile body is installed on a front end surface of a sliding door 1 of an automobile shown in FIG. 8 of which the sliding door 1 moves between at least two positions to open and close an opening of the automobile body. A sensor (pressure sensitive sensor) 80 installed on the protector 10 with the sensor outputs corresponding electric signal upon detecting an object such as a part of human body (finger, hand or leg) between the sliding door 1 and a body side opening (may also be front door or side door). Both the present invention and the prior art include the structures of FIG. 10 to FIG. 13(a), FIG. 13(b) and FIG. 13(c). But the present invention is different from the prior art shown in FIG. 14 and FIG. 15 in structure of a terminal part of the protector 10 with the sensor after die molding and method of die molding the same. When constituents or items correspond to those in prior arts, the same symbols are used.

The protector 10 with the sensor includes: an installation base member 11 operatively coupled on a flange (not shown) formed on a sliding door 1 directly; a hollow part 12 integrally molded with the installation base member 11 and which makes elastic contact with the object when the object including a finger is disposed between a front end surface of the sliding door 1 and a body side opening which faces the front end surface when the door 1 is moved towards a closed position; and the sensor (pressure sensitive sensor) 80 which is incorporated in the hollow part 12 and which outputs a corresponding electric signal upon detecting the object. The sensor (pressure sensitive sensor) 80 has two core wires (electrode wires) 31, 32 extending in an upper and lower direction (longitudinal direction) embedded in rubber like elastic bodies 34, 35 having conductivity with a space 33 therebetween, which are fixed in the hollow part 12. The rubber like elastic bodies 34, 35 having conductivity are made of conductive rubber mainly including synthetic rubber including EPDM. The sensor 80 is integrally molded with the hollow part 12.

Figure 1B:
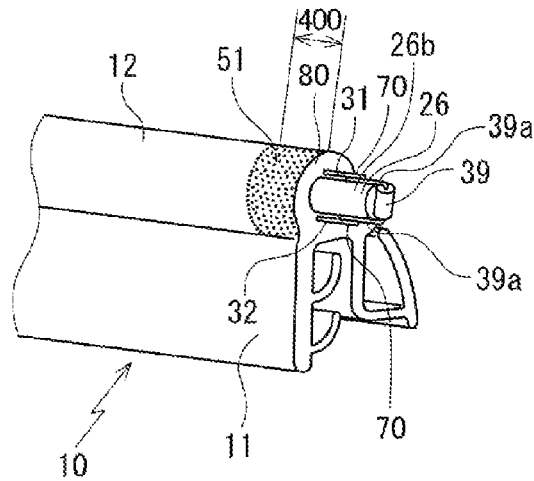
Figure 1C:
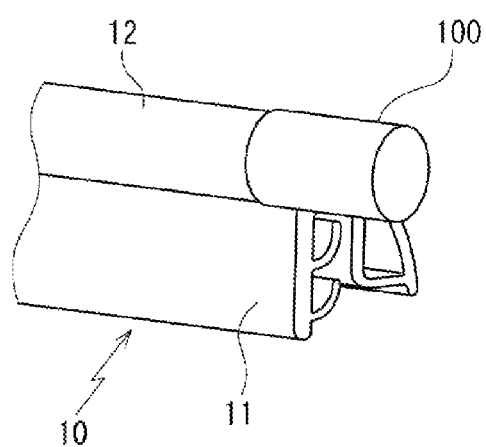
Figure 5A:
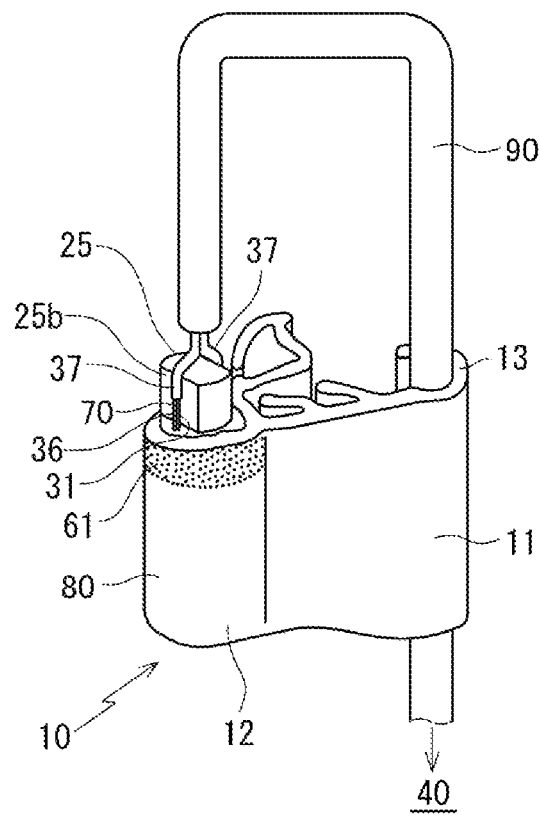
FIG. 5(a) and FIG. 5(b) are perspective views showing an order in which a primary sealing layer is formed on a lower side terminal part of a protector with a sensor according to an embodiment of the present invention.
Figure 5B:
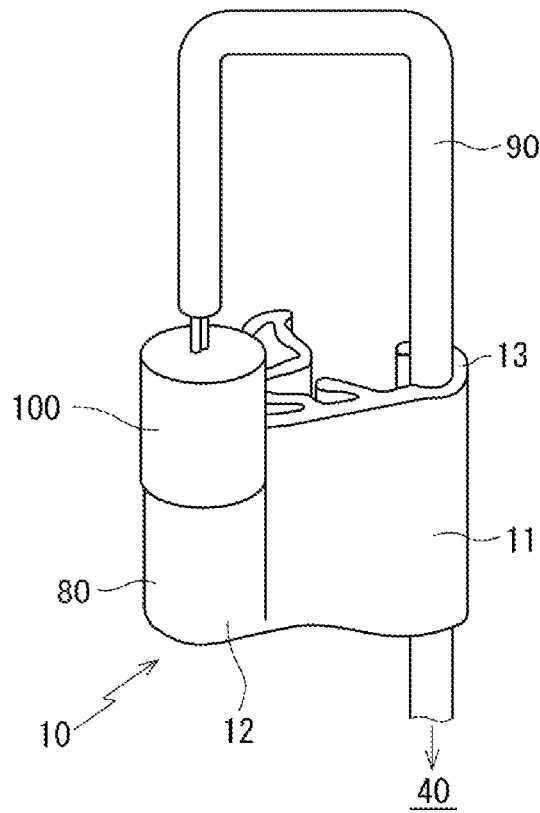

As shown in FIG. 1(a), FIG. 1(b) and FIG. 1(c), in an upper side terminal part of the protector 10 with the sensor, an insert 26 fills up the space 33 of the hollow part 12 which is open in an end side terminal part. As shown in FIG. 5(a) and FIG. 5(b), in a lower side terminal part of the protector 10 with the sensor, an insert 25 fills up the space 33 of the hollow part 12 which is open in an end side terminal part (in FIG. 5(a) and FIG. 5(b), an insertion part 25a of the insert 25 is omitted).

The installation base member 11 and the hollow part 12 of the protector 10 with the sensor form an extrusion molded part made of a rubber like elastic body including: synthetic rubber such as EPDM; and thermoplastic elastomer such as TPO, TPS. The upper and lower side terminal parts of the protector 10 with the sensor are die molded for arranging an external shape thereof.

The insert 25, 26 is made of polypropylene, polyethylene, polyethylene terephthalate, nylon, 6 nylon, 6-6 nylon or thermoplastic elastomer (TPE). Examples of the material of the insert 25, 26 also include flexible and non-conductive material such as olefin TPO or styrene TPS of TPE. The insert 25 includes an insertion part 25a, 26a on a side of one end and a protrusion part 25b, 26b on a side of another end.

The insertion part 25a, 26a has a cross sectional shape which is substantially the same as or a little larger than the space 33 for being inserted in the space 33 of the hollow part 12 and tightly filling up the space 33, thereby preventing decline in sensor function caused by die molding material flowing in the space 33 during die molding.

A body of a resistor 39 (electrical component) is stably positioned on an end part of the protrusion part 26b of the insert 26 which is used in the upper side terminal part of the protector 10 with the sensor. On both side surfaces (upper surface and lower surface in FIG. 1(a) and FIG. 1(b)) of the protrusion part 26b, the two wire connection parts 70, 70 are exposed. The wire connection parts 70, 70 are formed by piling the two legs (leads) 39a, 39a of the resistor 39 on the two core wires 31, 32 and connecting the two legs (leads) 39a, 39a and the two core wires 31, 32 by means of resistance welding or soft soldering. The core wires 31, 32 are drawn out toward an upside in the longitudinal direction (right side in FIG. 1(a) and FIG. 1(b) relative to a sheet) from the hollow part 12.

The insertion part 26a of the insert 26 fills up the space 33. Then, the protrusion part 26b of the insert 26, the wire connection parts 70, 70, and the body and the legs 39a, 39a of the resistor 39 are embedded in a die molded part by die molding the upper end of the protector 10 with the sensor, and are not exposed.

Figure 2A:
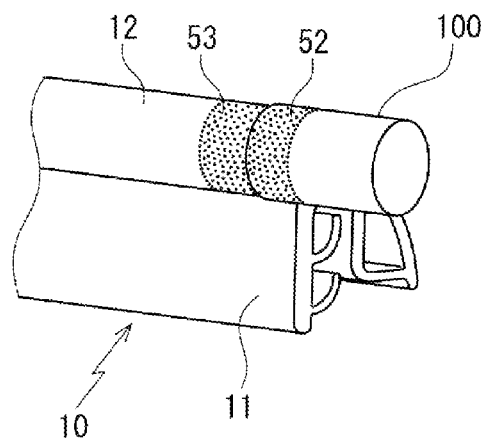
FIG. 2(a) and FIG. 2(b) are perspective views showing an order in which a secondary sealing layer is formed on the upper side terminal part of the protector with the sensor of FIG. 1.

The upper side terminal part of the protector 10 with the sensor which is extrusion molded has a primary sealing layer 100 and a secondary sealing layer 200 formed thereon by means of injection molding respectively. The primary sealing layer 100 covers the wire connection parts 70, 70 of the legs 39a, 39a of the resistor 39 and the core wires 31, 32, the body of the resistor 39 and the protrusion part 26b of the insert 26, which are exposed from the terminal part, from an outside while also covering a ground part 51 on a surface of the hollow part 12 of the terminal part of the extrusion molded part. The secondary sealing layer 200 covers a ground part 53 formed by grinding a surface of the hollow part 12 beyond a surface of the primary seal as well as the primary sealing layer 100, and then forms an external shape of a product. Close adherence improves by forming a ground part 52 around a borderline of the primary sealing layer 100 with the hollow part 12 as shown in FIG. 2(a). Also, the primary sealing layer 100 as a whole may be ground, not only around a boundary surface.

On both side surfaces (left side surface and right sue surface in FIG. 5(a)) of the protrusion part 25b of the insert 25 which is used in the lower side terminal part of the protector 10 with the sensor, the two wire connection parts 70, 70 are exposed. The wire connection parts 70, 70 are formed by piling the two leads 36, 36 on the two core wires 31, 32 and connecting the two leads 36, 36 and the two core wires 31, 32 by means of resistance welding or soft soldering. The two leads 36, 36 as top ends are naked wires bared from covered parts 37. The two core wires 31, 32 are drawn out toward a downside in the longitudinal direction (upper side in FIG. 5(a) relative to a sheet) from the hollow part 12.

The two leads 36, 36 which are covered with insulator respectively are tied by the wire harness 90 and an outer circumferential surface of the two leads 36, 36 thus tied is coated by skin of the wire harness 90. On an end part of the wire harness 90, the two leads 36, 36 are drawn out from the covered parts 37, 37 which are drawn out from the end part of the wire harness 90, and are bared from the covered parts 37, 37. The wire harness 90 is joined with a control unit 40 in which the object is detected.

The insertion part 25a of the insert 25 fills up the space 33. Then, the protrusion part 25b of the insert 25 and the wire connection parts 70, 70 are embedded in a die molded part by die molding a lower end of the protector 10 with the sensor and are not exposed.

Figure 6:
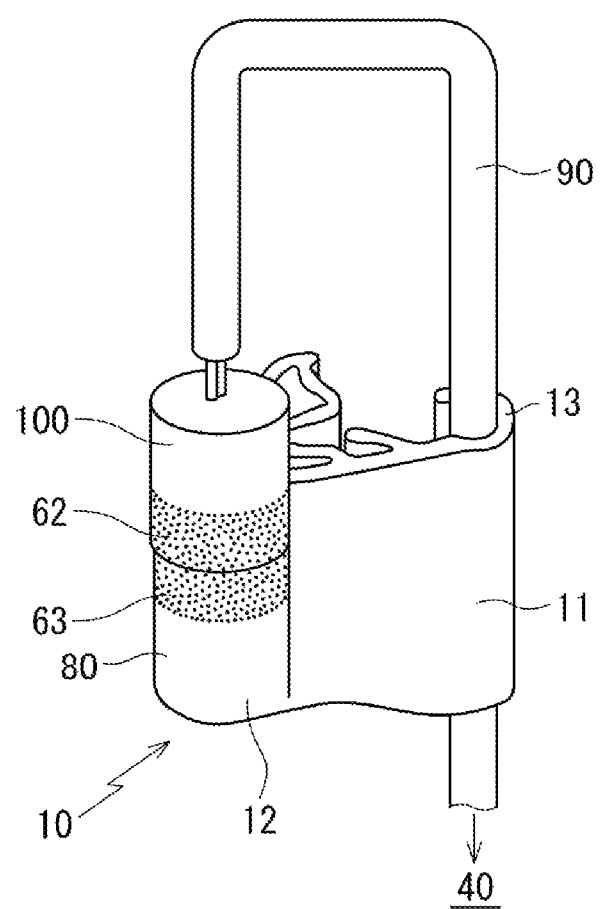
FIG. 6 is a perspective view showing a state before a secondary sealing layer is formed on the lower side terminal part of the protector with the sensor according to the embodiment of the present invention.

The lower side terminal part of the protector 10 with the sensor, which is extrusion molded, has a primary sealing layer 100 and a secondary sealing layer 200 formed thereon by means of injection molding respectively. The primary sealing layer 100 covers the wire connection parts 70, 70 of the core wires 31, 32 and the two leads 36, 36 and the protrusion part 25b of the insert 25, which are exposed from the terminal part, from an outside while also covering a ground part 61 on a surface of the hollow part 12 of the terminal part of the extrusion molded part. The secondary sealing layer 200 covers a ground part 63 formed by grinding a surface of the hollow part 12 beyond a surface of the primary seal as well as the primary sealing layer 100, and then forms an external shape of a product. Close adherence improves by forming a ground part 62 around a boundary surface of the primary sealing layer 100 with the hollow part 12 as shown in FIG. 6. Also, the primary sealing layer 100 as a whole may be ground, not only around a borderline.

Referring to FIG. 1(a), FIG. 1(b), FIG. 1(c), FIG. 2(a) and FIG. 2(b), an order related to a method of molding the upper side terminal part of the protector 10 with the sensor will be described.

First, a surface of the hollow part 12 of the upper side terminal part of the protector 10 with the sensor, in which the insertion part 26a of the insert 26 is inserted as shown in FIG. 1(a), is ground as shown in FIG. 1(b). In the present embodiment, a primary ground range 400 on the surface of the hollow part 12 is subjected to the grinding, which is from an upper end surface of the protector 10 with the sensor to a position at a distance from the upper end surface. The surface is ground by buffing for scratching the surface (surrounding surface) of the hollow part 12.

Then, the upper side terminal part of the protector 10 with the sensor is positioned in a primary die not shown; and, as shown in FIG. 1(c), the primary seal is formed by means of the ordinary injection molding for covering the wire connection parts 70, 70, the body and the legs 39a, 39a of the resistor 39, and the protrusion part 26b of the insert 26 with the primary sealing layer 100 from the outside, while also covering the ground part 51.

As a result, close adherence of the primary sealing layer 100 on the terminal part of the protector 10 with the sensor improves.

Then, as shown in FIG. 2(a), the surface of the hollow part 12 beyond the primary seal is ground by buffing; and the upper side terminal part of the protector 10 with the sensor is positioned in a secondary die not shown. Then, as shown in FIG. 2(b), the secondary seal is formed for covering a ground part 53 on the surface of the hollow part 12 beyond the surface of the primary seal as well as the primary sealing layer 100 with the secondary sealing layer 200 which then forms an external shape of an upper end of the protector 10 with the sensor as a product.

As a result, close adherence of the secondary sealing layer 200, which is formed on the terminal part of the protector 10 with the sensor by means of the injection molding, on the hollow part 12 improves.

According to the embodiment, as shown in FIG. 2(a), since the boundary surface of the primary sealing layer 100, which is formed by means of the injection molding, with the hollow part 12 is also ground, the close adherence of the secondary sealing layer 200 on the primary sealing layer 100 as well as the close adherence of the secondary sealing layer 200 on the surface of the hollow part 12 improves.

Figure 2B:
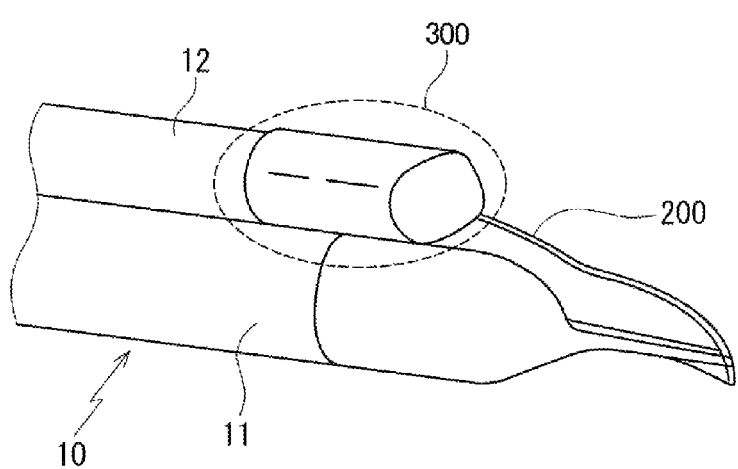
Figure 3:
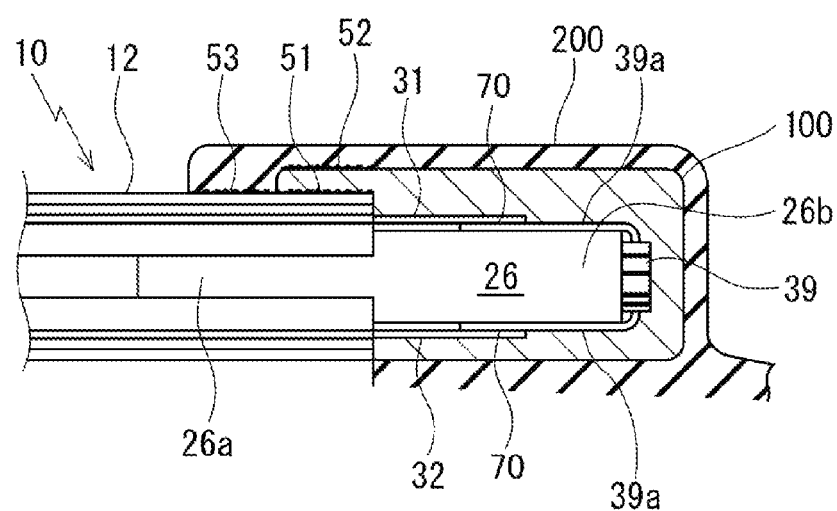
FIG. 3 is an enlarged cross section of a part 300 of FIG. 2(b)

FIG. 3 shows an interior of a resultant part 300 of FIG. 2(b) in detail.

An order related to a method of molding the lower side terminal part of the protector 10 with the sensor will be described. First, as shown in FIG. 5(a), the surface of the hollow part 12 of the lower side terminal part of the protector 10 with the sensor is ground by buffing for scratching the surface (surrounding surface) of the hollow part 12. In the present embodiment, a part 61 on the surface of the hollow part 12 is subjected to the grinding, which is a range from a lower end surface of the protector 10 with the sensor to a position at a distance from the lower end surface.

Then, the lower side terminal part of the protector 10 with the sensor is positioned in the primary die not shown; and, as shown in FIG. 5(b), the primary seal is formed by means of the ordinary injection molding for covering the wire connection parts 70, 70 and the protrusion part 25b of the insert 25 with the primary sealing layer 100 from the outside, while also covering the ground part 61.

As a result, close adherence of the primary sealing layer 100 on the terminal part of the protector 10 with the sensor improves.

Figure 7:
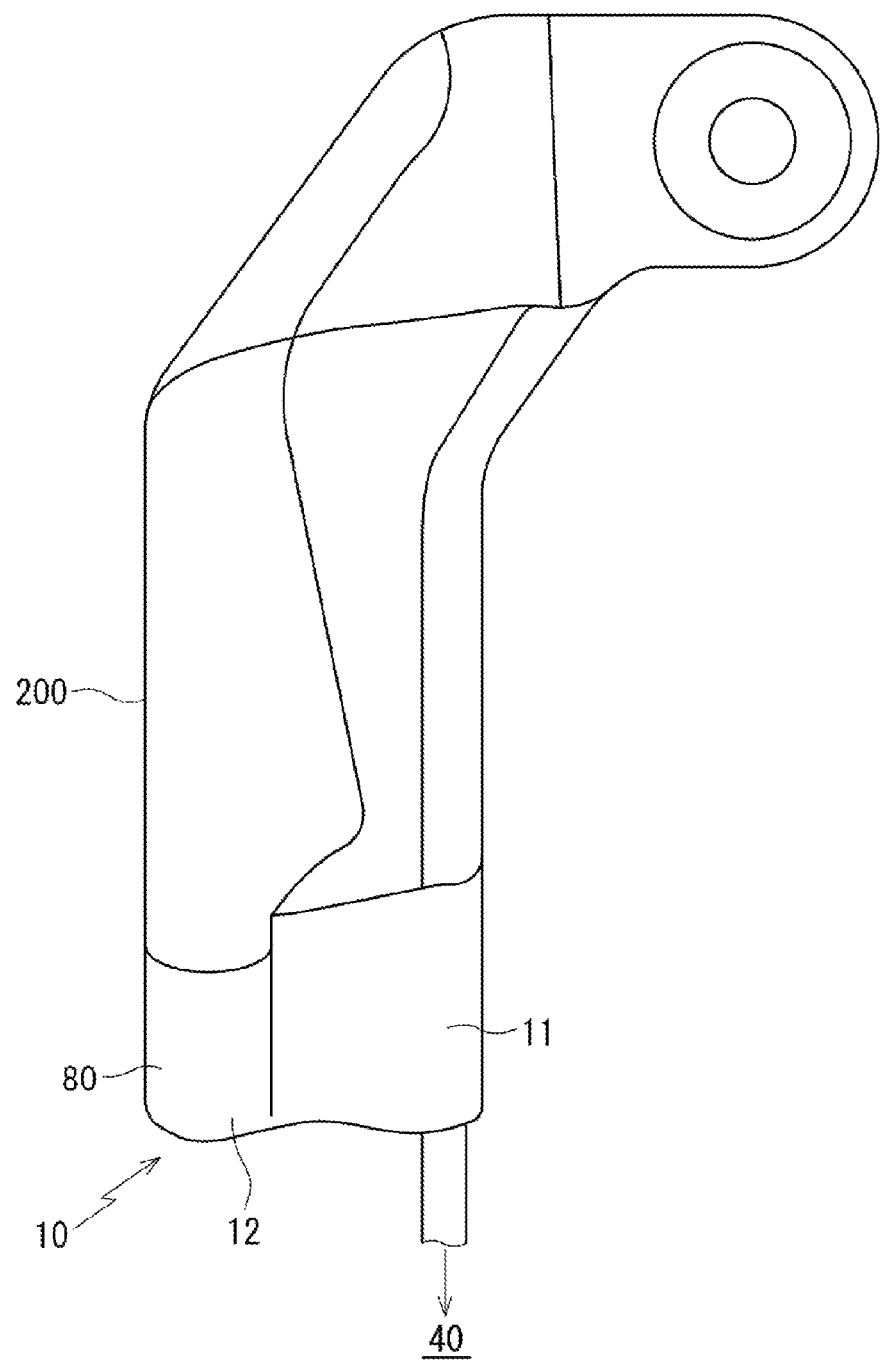
FIG. 7 is a perspective view of the lower side terminal part of the protector with the sensor of FIG. 6, having the secondary sealing layer formed thereon.

Then, the surface of the hollow part 12 beyond the primary seal is ground by buffing as shown in FIG. 6; and the lower side terminal part of the protector 10 with the sensor is positioned in the secondary die not shown. Then, as shown in FIG. 7, the secondary seal is formed for covering the ground part 63, which is on the surface of the hollow part 12 beyond the primary seal, as well as the primary sealing layer 100 with the secondary sealing layer 200. The secondary sealing layer 200 also forms an external shape of a lower end of the protector 10 with the sensor as a product.

As a result, close adherence of the secondary sealing layer 200, which is formed on the terminal part of the protector 10 with the sensor by means of the injection molding, on the hollow part 12 improves.

According to the embodiment, as shown in FIG. 6, since the boundary surface of the primary sealing layer 100, which is formed by means of the injection molding, with the hollow part 12 is also ground, the close adherence of the secondary sealing layer 200 on the primary sealing layer 100 as well as the close adherence of the secondary sealing layer 200 on the surface of the hollow part 12 improves.

The die molding material of the primary sealing layer 100 fuses the upper end and the lower end of the protector 10 with the sensor during the injection molding of the primary sealing layer 100. The die molding material of the primary sealing layer 100 may include any kind of resin composite containing olefin thermoplastic resin. Examples of the die molding material of the primary sealing layer 100 include: the thermoplastic resin containing at least one of polyethylene and polypropylene; polyethylene; and polypropylene. The examples also include: copolymer of polyethylene and polypropylene (ethylene-propylene copolymer), having rubber like elasticity. Examples of the copolymer include: Hifax (registered trademark); Adflex (registered trademark); Softell (registered trademark); P.E.R. (Tokuyama Corporation); Vistamaxx (registered trademark); which are known as a reactor type.

The examples of the die molding material of the primary sealing layer 100 further include: EPDM (ethylene-propylene-diene terpolymer) and EPM (ethylene-propylene copolymer).

The examples of the die molding material of the primary sealing layer 100 further include: TPO (olefin thermoplastic elastomer); and TPS (styrene thermoplastic elastomer) containing olefin resin; which are excellent in heat resistance and pressure resistance so that the primary sealing layer 100 does not melt during the injection molding of the secondary sealing layer 200.

The die molding material of the primary sealing layer 100 may also include a blend of not less than two of the above-mentioned thermo plastic resin composite.

The resin composite which is colorless and transparent or colorless and semitransparent enables to visually confirm the condition of the wire connection parts 70, 70. The resin composite preferably is flexible and has rubber elasticity.

The die molding material of the secondary sealing layer 200 fuses the primary sealing layer 100 during the injection molding of the secondary sealing layer 200. The die molding material of the secondary sealing layer 200 is made of the rubber like elastic body including: EPDM (ethylene-propylene-diene terpolymer); EPM (ethylene-propylene copolymer); TPO (olefin thermoplastic elastomer); and TPS (styrene thermoplastic elastomer).

In the present embodiment, the extrusion molded part is made of EPDM and the die molding material of the primary seal and the secondary seal includes TPO.

In the terminal part of the extrusion molded part, the secondary sealing layer 200 abuts an end surface and coats a side surface of the hollow part 12. On the other hand, the secondary sealing layer 200 abuts an end surface and does not coat a side surface of the installation base member 11.

According to the protector 10 with the sensor, the terminal part of the extrusion molded part is die molded after the insertion part 25a, 26a of the insert 25, 26 made of the non-conductive material is inserted in and fills up the space 33. The structure prevents decline in sensor function caused by die molding material flowing into a side of the sensor 80 from the space 33 on the terminal part of the extrusion molded part during the die molding. In addition, the insertion part 25a, 26a of the insert 25, 26 inserted in the space 33 separates the two wire connection parts 70, 70 from each other and prevents the two wire connection parts 70, 70 from coming into contact with each other.

The wire connection parts 70, 70 of the core wires 31, 32 and the two leads 36, 36 and the wire connection parts 70, 70 of the core wires 31, 32 and the legs 39a, 39a of the resistor 39, which are exposed from the terminal part of the extrusion molded part, are doubly sealed by the primary sealing layer 100 and the secondary sealing layer 200. The structure improves certainty in sealing property in the terminal part.

In addition, the primary sealing layer 100 and the secondary sealing layer 200 are formed by means of the ordinary injection molding. Accordingly, as compared with a case using adhesive, the primary sealing layer 100 and the secondary sealing layer 200 do not necessitate time for curing the adhesive, which reduces time for operation and lowers cost. Further, since the structure enables to quantitatively inject the die molding material into the dies at stable pressure, resultant products are hardly uneven and perform stable sealing function.

When forming the primary sealing layer 100 which directly covers the wire connection parts 70, 70 by means of injection molding, the surface of the hollow part 12 of the terminal part of the extrusion molded part is ground first by buffing. Then, the primary sealing layer 100 covers the wire connection parts 70, 70 and the side of the protrusion part 25b, 26b of the insert 25, 26, while also covering the ground part 51, 61. As compared with a case in which the surface is not ground, the structure improves the close adherence of the primary sealing layer 100 on the terminal part of the protector 10 with the sensor which is extrusion molded.

Accordingly, the close adherence of the primary sealing layer 100 formed by means of the injection molding on the terminal part of the protector 10 with the sensor formed by means of the extrusion molding improves, and the primary sealing layer 100 does not easily come off the terminal part of the protector 10 with the sensor. The structure prevents water leak and improves sealing property.

In addition, the secondary seal formed by means of the injection molding covers the ground part 53, 63 on the surface of the hollow part 12 beyond the surface of the primary seal as well as the primary sealing layer 100. As compared with an edge gluing, double overmolding improves sealing property.

Figure 4A:
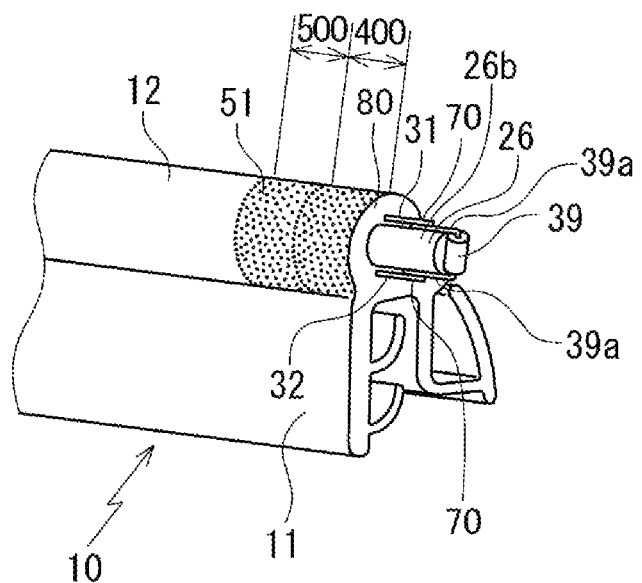
FIG. 4(a) and FIG. 4(b) are perspective views showing another order in which the primary sealing layer is formed on the upper side terminal part of the protector with the sensor according to the embodiment of the present invention.
Figure 4B:
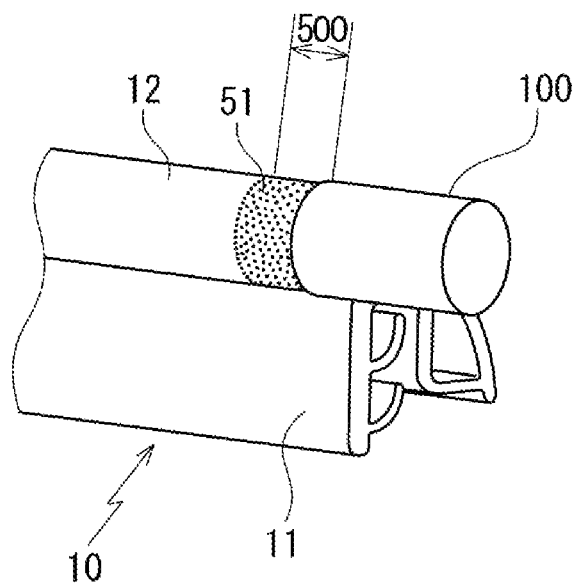

In the present embodiment, after the primary seal is formed, as shown in FIG. 2(a), the surface of the primary sealing layer 100 is ground and the surface of the hollow part 12 on which the secondary seal is to be formed is also ground. But, as shown in FIG. 4(a), the range subjected to grinding on the surface of the hollow part 12 may be wider, including a primary ground range 400 on a position close to an end surface of said extrusion molded part and a secondary ground range 500 on a position far from the end surface. Then, the primary seal is formed by means of the injection molding for covering the primary ground range 400, and the secondary seal is formed by means of the injection molding for covering the secondary ground range 500.

In other words, since the secondary ground range 500 on which the secondary seal is to be piled is prepared even before the primary seal is formed, time required for operation after the primary seal is formed is reduced. Also, grinding the surface of the primary sealing layer 100 thus formed may be omitted. As a result, it is possible to form the secondary seal right after forming the primary seal, thereby improving efficiency of an operation.

In addition, in the present embodiment, as shown in FIG. 2(a) and FIG. 6, the ground part 53, 63 is formed on the surface of the hollow part 12 beyond the surface of the primary seal as well as the ground part 52, 62 on the primary sealing layer 100. But, only the ground part 53, 63 may be formed on the surface of the hollow part 12 beyond the surface of the primary seal without forming the ground part 52, 62.

While the present embodiment specifies an example that the installation base member 11, the hollow part 12 and the sensor 80 are integrally molded, the installation base member 11, the hollow part 12 and the sensor 80 may be separately molded so that the installation base member 11 and the hollow part 12 are fixed by adhesive or adhesive tape, and the sensor 80 is inserted in the hollow part 12 for unification. Alternatively, any two of the installation base member 11, the hollow part 12 and the sensor 80 may be integrally molded and a remaining member is separately molded.

In the present embodiment, the installation base member 11 has a plurality of holding lips 14 formed inside and a core 15 having a substantially U-shaped cross section embedded therein. But the installation base member 11 may have only one holding lip 14, 14 or may be without the core 15 embedded therein. Also, any installation base member 11 having a part thereof for fixing the hollow part 12 and the sensor 80 thereon is usable. Methods of fixing the hollow part 12 and the sensor 80 on the sliding door 1 vary, including use of adhesive tape as well as gripping and fitting the hollow part 12 and the sensor 80.

The present embodiment specifies an example that the protector 10 with the sensor is installed on the sliding door 1 side of the automobile, which slides frontward and rearward. But the protector 10 with the sensor may be installed on the body side opening for detecting the object between the sliding door and the body side opening.

Figure 9:
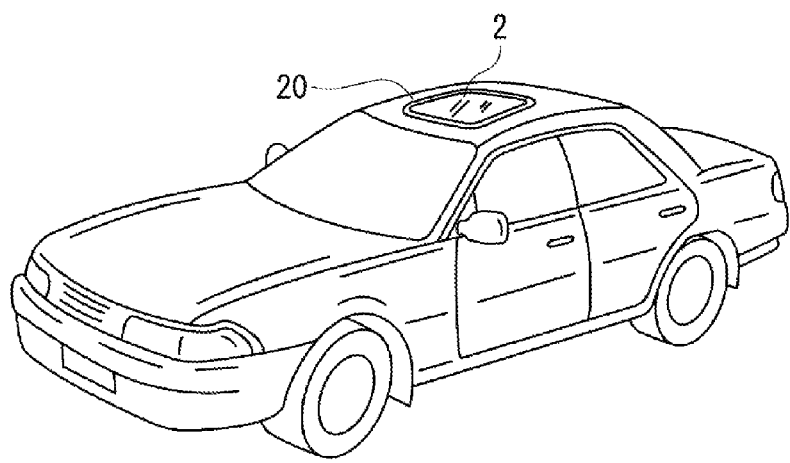
FIG. 9 is a perspective view of an automobile with a sun roof.
Figure 10:
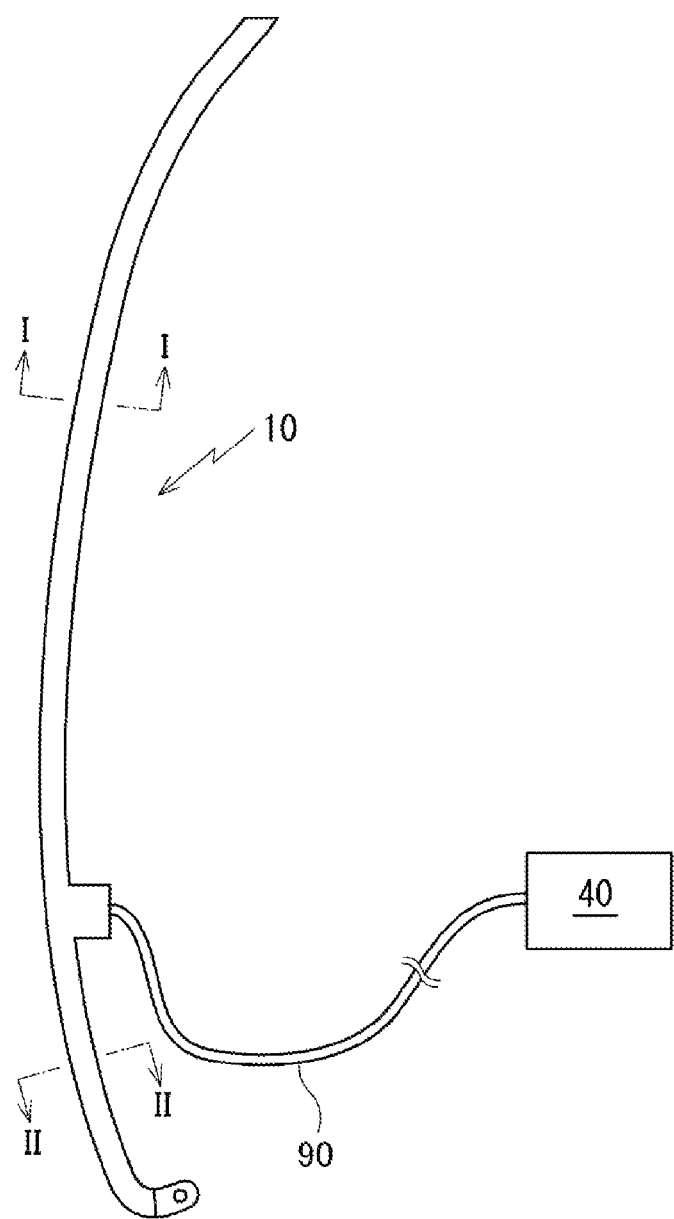
FIG. 10 is a side view of the protector with the sensor of FIG. 8.
Figure 11:
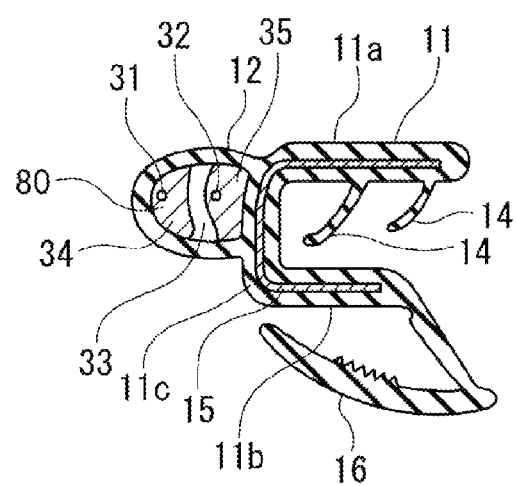
FIG. 11 is a I-I line enlarged cross section of FIG. 10.
Figure 12:
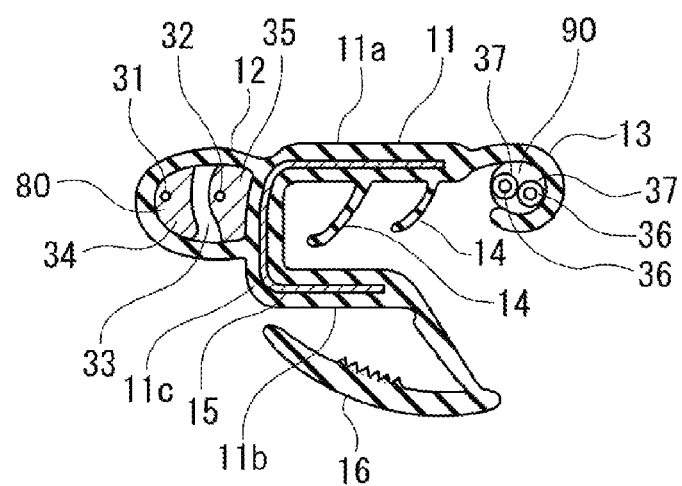
FIG. 12 is a II-II line enlarged cross section of FIG. 10.

Also, the protector 10 with the sensor is applicable to a back door or a sun roof 2 (FIG. 9).

We claim:

1. A protector with a sensor comprising:
an installation base member operatively coupled on at least one of a peripheral edge of an opening/closing panel or a peripheral edge of an opening of the automobile body, said opening/closing panel being moveable between at least two positions to open and close said opening of an automobile body, the opening/closing panel being selected from a group consisting of a door of an automobile and a sun roof of an automobile; and a hollow part unified with the installation base member, the hollow part having two core wires and a space provided therein, the space being positioned between the two core wires; said installation base member and said hollow part forming an extrusion molded part made of a rubber like elastic body which is extrusion molded, in which:
when an object is disposed between said opening/closing panel and said opening and makes contact with said hollow part when said opening/closing panel is moved towards a closed position, an electric signal provides an indication that said object is in said opening; and
in a terminal part of said extrusion molded part, said core wires extend in a direction parallel to the peripheral edge of said opening are connected with two leads, said two leads being joined with a control unit or an electrical component, and a side of one end of an insert made of a non-conductive material is inserted in and fills up said space, and said terminal part of said extrusion molded part is die molded, wherein:
the terminal part of said extrusion molded part which is extrusion molded has a primary sealing layer and a secondary sealing layer formed thereon by means of injection molding respectively, said primary sealing layer covering wire connection parts of said core wires and said leads and a side of another end of said insert while also covering a ground part on a surface of said hollow part of the terminal part of said extrusion molded part, and said secondary sealing layer being piled on and covering the primary sealing layer, and said secondary sealing layer forming an external shape of a product.

2. A method of molding an end part of a protector with a sensor comprising:
an installation base member operatively coupled on at least one of a peripheral edge of an opening/closing panel or a peripheral edge of an opening of the automobile body, said opening/closing panel being moveable between at least two positions to open and close said opening of an automobile body, the opening/closing panel being selected from a group consisting of a door of an automobile and a sun roof of an automobile; and a hollow part unified with the installation base member, the hollow part having two core wires and a space provided therein, the space being positioned between the two core wires; said installation base member and said hollow part forming an extrusion molded part made of a rubber like elastic body which is extrusion molded, in which:
when an object is disposed between said opening/closing panel and said opening and makes contact with said hollow part when said opening/closing panel is moved towards a closed position, an electric signal provides an indication that said object is in said opening; and
in a terminal part of said extrusion molded part, said core wires extend in a direction parallel to the peripheral edge of said opening are connected with two leads, said two leads being joined with a control unit or an electrical component, and a side of one end of an insert made of a non-conductive material is inserted in and fills up said space, and said terminal part of said extrusion molded part is die molded, the method comprising:
forming a primary seal by grinding a surface of said hollow part of the terminal part of said extrusion molded part, positioning a ground part on a die and covering wire connection parts of said core wires and said leads and a side of another end of said insert by means of injection molding; and
forming a secondary seal on a part formed with the primary seal by means of the injection molding for forming an external shape of a product.

3. The method of molding the end part of the protector with the sensor as claimed in claim 2, the method further comprising:
grinding a surface of said hollow part beyond said primary seal; and
forming the secondary seal by means of the injection molding for covering a ground part on the surface of said hollow part.

4. The method of molding the end part of the protector with the sensor as claimed in claim 3, wherein: a range subjected to grinding on the surface of said hollow part of the terminal part of said extrusion molded part comprises a primary ground range on a position close to an end surface of said extrusion molded part and a secondary ground range on a position far from said end surface, said primary seal being formed by means of the injection molding for covering said primary ground range, and said secondary seal being formed by means of the injection molding for covering said secondary ground range.

5. The method of molding the end part of the protector with the sensor as claimed in claim 4, wherein: said extrusion molded part is made of EPDM, and die molding material of said primary seal and said secondary seal comprises TPO.

6. The method of molding the end part of the protector with the sensor as claimed in claim 3, wherein: said extrusion molded part is made of EPDM, and die molding material of said primary seal and said secondary seal comprises TPO.

7. The method of molding the end part of the protector with the sensor as claimed in claim 2, wherein: said extrusion molded part is made of EPDM, and die molding material of said primary seal and said secondary seal comprises TPO.

* * * * *